United States Patent
Smith et al.

[11] Patent Number: 6,129,004
[45] Date of Patent: *Oct. 10, 2000

[54] BRAKE ACTUATOR AND METHOD OF MANUFACTURE

[75] Inventors: Teddy D. Smith, Fresno, Calif.; Ralph D. Russell, Yuma, Ariz.; Michael D. Stubblefield, Fresno, Calif.

[73] Assignee: TSE Brakes, Inc., Fresno, Calif.

[*] Notice: This patent is subject to a terminal disclaimer.

[21] Appl. No.: 09/088,942

[22] Filed: Jun. 2, 1998

Related U.S. Application Data

[63] Continuation-in-part of application No. 08/662,993, Jun. 13, 1996, Pat. No. 5,758,564.

[51] Int. Cl.$^7$ ............................................. F16J 3/02
[52] U.S. Cl. ............................................. 92/98 R
[58] Field of Search ................... 92/98 R, 109, 92/128, 59, 63; 29/888.06, 890.09

[56] References Cited

U.S. PATENT DOCUMENTS

| | | |
|---|---|---|
| 2,541,205 | 2/1951 | Christophersen . |
| 3,101,133 | 8/1963 | House . |
| 4,850,263 | 7/1989 | Rumsey . |
| 4,960,036 | 10/1990 | Gummer . |
| 5,062,455 | 11/1991 | Schurter . |
| 5,067,391 | 11/1991 | Choinski . |
| 5,193,432 | 3/1993 | Smith . |
| 5,205,205 | 4/1993 | Choinski et al. . |
| 5,285,716 | 2/1994 | Thompson . |
| 5,315,918 | 5/1994 | Pierce ................................ 92/63 |
| 5,353,688 | 10/1994 | Pierce . |
| 5,507,217 | 4/1996 | Plantan . |
| 5,758,564 | 6/1998 | Smith et al. ..................... 92/98 R |
| 5,791,232 | 8/1998 | Smith .............................. 92/128 |

FOREIGN PATENT DOCUMENTS

| | | |
|---|---|---|
| 7308049 U | of 1973 | Germany . |
| 2000-225 | of 1979 | United Kingdom . |
| 2000225 | of 1979 | United Kingdom . |

*Primary Examiner*—Edward K. Look
*Assistant Examiner*—Thomas E. Lazo
*Attorney, Agent, or Firm*—Mark D. Miller

[57] ABSTRACT

A method and apparatus is disclosed for securely attaching existing conventional central adaptors for air brake actuators to service brake housings, emergency brake housings, or both, that are made from a metal that is dissimilar to that of the adaptor without major modification to either the housing or the adaptor. An annular shoulder with an elongated annular flange above it is provided on the steel part, and the aluminum part is provided with a small outwardly extending annular lip. A flexible diaphragm is first placed directly on the shoulder of the selected steel part. The aluminum part is then placed on top of the diaphragm such that the annular lip of the aluminum part fits inside the annular flange of the steel part. A slightly deformable annular steel piece is placed around the aluminum part so that it comes to rest against the annular aluminum lip while also touching the annular steel flange of the steel part. One or more breaks may be provided in the annular steel piece in order to allow it to be opened sufficiently to fit around the aluminum part. A weld is then applied to connect the annular steel piece(s) to the annular flange, thereby holding the aluminum or steel adaptor and diaphragm securely in place.

15 Claims, 6 Drawing Sheets

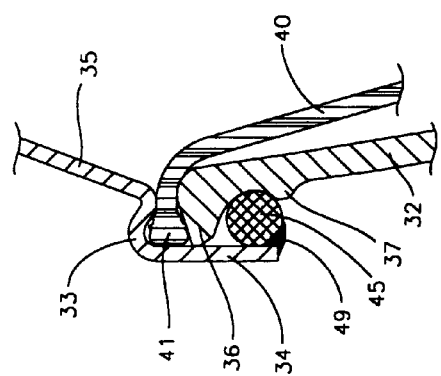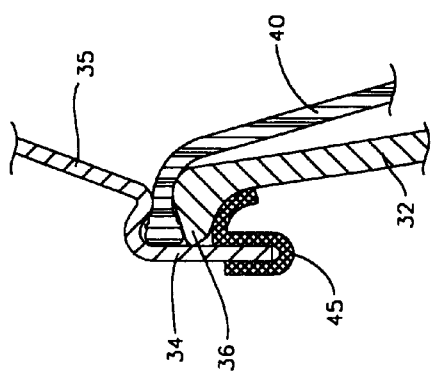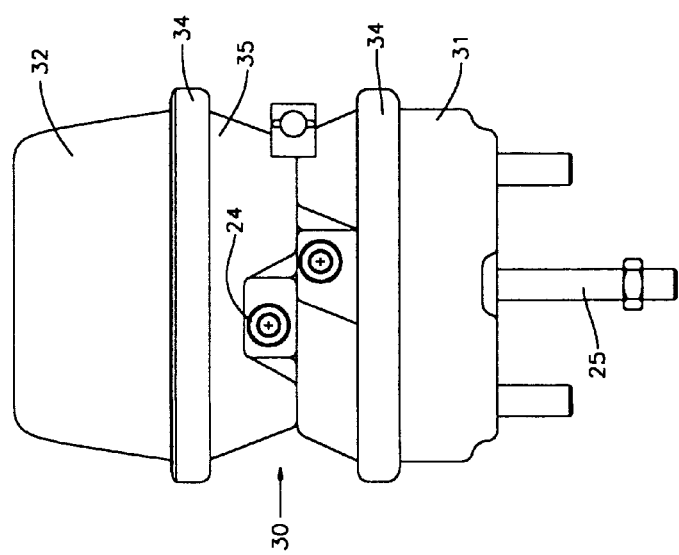

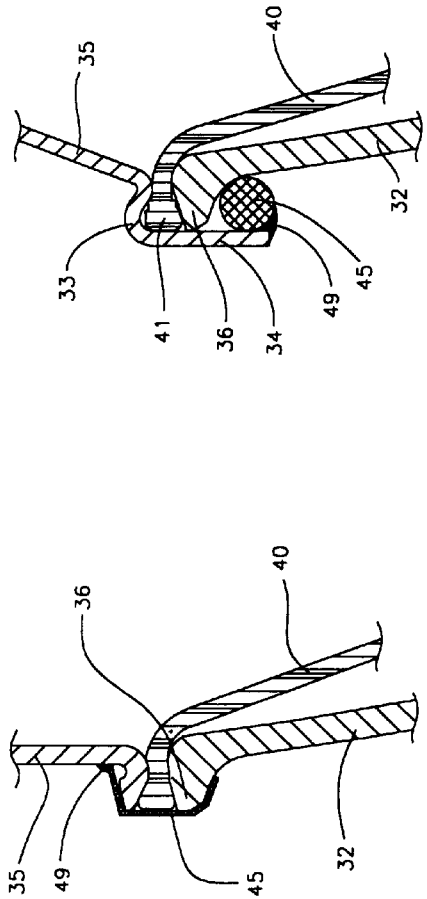
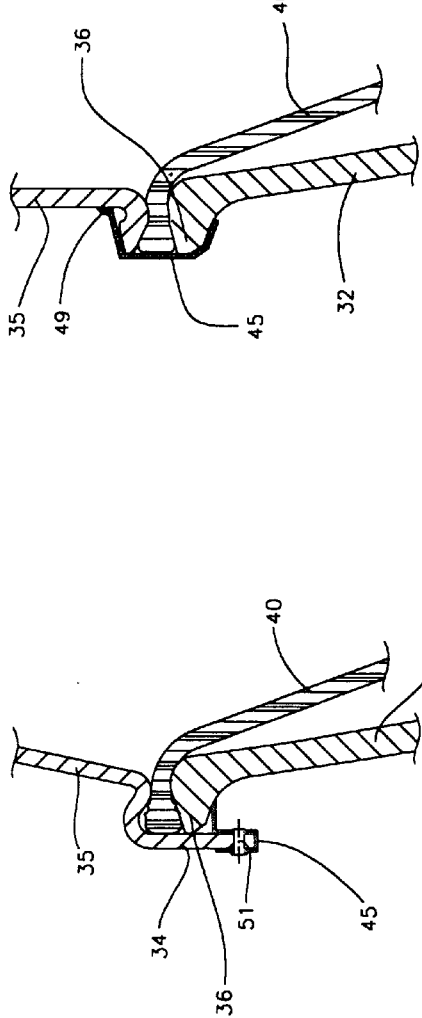
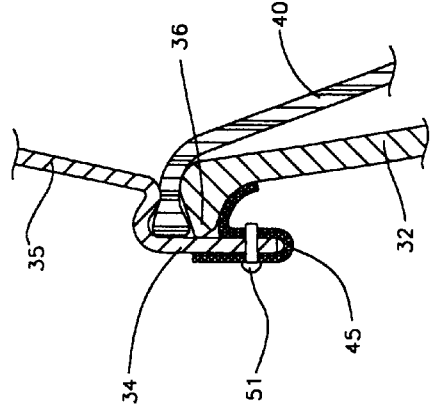
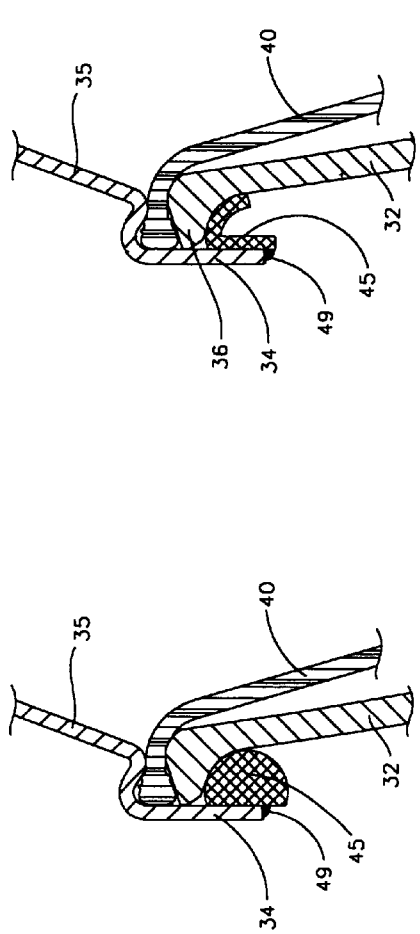

BRAKE ACTUATOR AND METHOD OF MANUFACTURE

This application is a continuation-in-part of application Ser. No. 08/662,993 filed on Jun. 13, 1996, now U.S. Pat. No. 5,758,564.

BACKGROUND OF THE INVENTION

1. Field of the Invention

The present invention relates to spring brake actuators used on commercial trucks, and more particularly to an apparatus and method for attaching either the outer spring brake housing, the outer service brake housing, or both, of a spring brake actuator to a central adaptor made of the same or a dissimilar metal.

2. Description of the Prior Art

Various forms of pneumatic vehicle spring brake actuators have been introduced over the years primarily for use in the trucking industry. A typical actuator includes a service brake portion which is used for slowing or stopping a vehicle, and may also include an emergency or parking brake portion. The service brake portion is characterized by a closed housing which contains a movable diaphragm stretched across the inside. One side of the diaphragm is connected to a centrally located slidable push rod which extends out of the housing for attachment to the brakes of the vehicle. On the other side of the diaphragm a sealed chamber is formed within the housing.

An opening is provided in the sealed chamber for connection to a pneumatic (air) pressure source usually provided by an on-board air compressor. The brakes of the vehicle can be applied by introducing sufficient pneumatic pressure into the sealed chamber to act against the service brake diaphragm which moves the push rod out. A small return spring is provided inside the housing around the push rod to urge it to retract when the air pressure behind the diaphragm is reduced.

When employed, a typical emergency brake portion is attached directly behind or made a part of the service brake assembly. The emergency brake is a separate closed housing which contains a heavy compression spring and a second movable diaphragm in sealed contact with a slidable central rod which communicates directly with the push rod of the service brake.

A second sealed chamber is formed inside the emergency brake housing on one side of the diaphragm, and the heavy compression spring is deployed on the opposite side. As with the service brake, the sealed chamber of the emergency brake is connected to the on-board pneumatic source of the vehicle. As long as sufficient air pressure is provided, the diaphragm in the emergency brake will remain fully extended thereby compressing the large spring. However, should pressure fall, or should there be a leak in the sealed chamber, the diaphragm will be unable to hold the large compression spring in place. When this occurs, either slowly or quickly, the large compression spring will cause the push rod to extend out thereby applying the brakes of the vehicle.

Under normal conditions, when the vehicle is parked, the air pressure to the emergency brake portion is cut off causing the large compression spring to apply the brakes.

Because the spring brake assembly is a critical safety system, it has to be designed and manufactured for exceptional reliability. Moreover, because the compression spring inside the spring actuator must exert a sufficient force to apply a maximum braking force to the vehicle independent of any external air pressure assistance from the service brake system, the spring in its compressed state stores sufficient kinetic energy to be lethal if the spring brake housing is opened without first taking adequate precautions to secure the spring in its compressed state or to release the stored energy in a controlled manner.

It is conventional to fabricate the spring brake housing containing the compression spring and diaphragm in two opposing sections (an aluminum adaptor housing, and a steel cap or cup) separated by the periphery of the diaphragm, with the two opposing sections being clamped together with sufficient force to maintain an air-tight seal between the diaphragm and the housing. Since unauthorized opening of the housing is potentially dangerous to the inexperienced mechanic, and since unauthorized re-sealing using defective seals or improper procedures could result in a poor diaphragm seal or other internal defect, it is also conventional to discourage unauthorized access, disassembly, and reassembly of the housing by appending a warning label to the housing and using a clamping means which is temper-resistant or at least tamper-evident, so that a new clamping means, not readily available to unauthorized personnel, is required before the housing can be reassembled.

Because of the danger presented by the compression of the large spring of these brake systems, numerous inventions have been patented which provide different ways of improving safety. Many of these inventions are directed towards securing the assembly of the two halves of the housing between which the diaphragm is deployed.

A typical service brake actuator housing is made of two cups which form the two halves. When combined with an emergency brake actuator, the housing has three distinct parts: a lower cup which forms the bottom of the service brake actuator, an upper cup which forms the top of the emergency brake actuator, and an hourglass-shaped central body or adaptor which is provided between them. The adaptor makes up the top half of the service brake housing, and the bottom half of the emergency brake housing. Normal positioning of the two brake diaphragms results in the adaptor being part of the sealed chambers of both the service brake and the emergency brake. As a result, it is common for the adaptor to include the openings into each chamber for attachment to the pneumatic pressure source for the brakes.

The below-listed United States and foreign patents are known to exist:

| No. | Patent No. | Date | Inventor |
|---|---|---|---|
| 1 | 2,541,205 | February 13, 1951 | Christophersen |
| 2 | 3,101,133 | August 20, 1963 | House |
| 3 | 7308049.6 | 1973 | Bosch (German) |
| 4 | 028074 | June 27, 1978 | Girling (G.B.) |
| 5 | 4,850,263 | July 25, 1989 | Rumsey |
| 6 | 4,960,036 | October 2, 1990 | Gummer |
| 7 | 5,062,455 | November 5, 1991 | Schurter |
| 8 | 5,067,391 | November 26, 1991 | Choinski |
| 9 | 5,193,432 | March 16, 1993 | Smith |
| 10 | 5,205,205 | April 27, 1993 | Choinski |
| 11 | 5,285,716 | February 15, 1994 | Thompson |
| 12 | 5,315,918 | May 31, 1994 | Pierce |
| 13 | 5,353,688 | October 11, 1994 | Pierce |

These patents disclose different methods and apparatus for attachment of the two halves or cups of a brake housing. Annular clamps are taught in U.S. Pat. No. 2,541,205 to Christophersen; U.S. Pat. No. 4,960,036 to Gummer, et al; and U.S. Pat. No. 5,193,432 to Smith. Such clamps are bulky and cumbersome in that the flanges, nuts and bolts used for connection may not easily fit into the cramped brake area of a vehicle.

Various ways of crimping or bending the edge flanges of the two housing cups are taught in U.S. Pat. No. 3,101,133 to House; a German Patent Application No. G 73 08 049.6 filed by Bosch; and U.S. Pat. No. 4,850,263 to Rumsey. The Rumsey patent utilizes overlapping lips where one is spinned over the other and bent into position by use of the lathe or other suitable machine. Each of these devices is limited to the use of a strong bendable metal such as steel.

The three U.S. patents to Gummer and Choinski (U.S. Pat. Nos. 4,960,036; 5,067,391; and 5,205,205) each disclose use of a clamp ring, use of a metal spun annular crimp of a flange on one of the housing cups, and the use of a separate circular channel clamp for attachment of the housing cups. Clamp rings are bulky and dangerous as noted above; and, although the circular channel clamp is a more permanent structure, it, as well as the metal spun flanges, are again limited to use with steel.

The use of a snap ring for attachment is shown in U.S. Pat. No. 5,353,688 to Pierce, et al, and in U.K. Patent No. GB 2,000,225A to Girling Midland, etc. U.S. Pat. No. 5,315,918 to Pierce discloses several methods of attachment including bayonet, screw thread, slots plus pins, and welds. Each of these methods of attachment requires that the cup and/or adaptor be uniquely modified in order to hold or accept such things as the snap ring, the pins, the screw threads, the slots, etc. Such adaptations render the cup and adaptor parts unusable except with correspondingly adapted parts, thereby severely limiting overall use, especially for repair and reuse.

The welding together of two halves of like material is shown in U.S. Pat. No. 5,062,455 to Schurter and U.S. Pat. No. 5,285,716 to Thompson.

It is desirable to be able to use adaptor and/or housing cup parts in brake actuators that are cast from aluminum as opposed to die pressed from steel sheets. However, attaching together such parts made from dissimilar metals has heretofore only been accomplished by use of annular clamps or the like. The ears, nuts and bolts of such clamps create significant clearance problems in the close tolerances of the brake area of a vehicle, making such methods of attachment unattractive.

Because of its hourglass shape, making an adaptor from steel requires the welding together of two halves. There is great expense involved in creating the necessary tooling to make these two halves, and then attaching them together. However, the price of aluminum can make it an attractive alternative to steel as a material to make the adaptor from.

It is also desirable for a brake manufacturer or remanufacturer to be able to use its conventional existing aluminum molds, or its existing steel tooling, to create adaptor or housing cup pieces that may be more securely attached to existing adaptors or housing cups made of a dissimilar metal. Thus, it is equally desirable to have a secure attachment device that does not require retooling of the parts that are to be attached together.

Casting the adaptor or housing cup pieces from aluminum is also desirable in that, compared to steel, many different molds may be easily and cheaply created for the various sized pieces.

In order to avoid increasing labor and service costs, it is common for a brake actuator having a single worn out component (e.g. a diaphragm) to simply be replaced in its entirety by another brake actuator, as opposed to repairing the actuator or replacing the worn out part in the field. When this occurs, the remaining parts of the old brake actuator, particularly the housing cups and adaptor, should be reusable for remanufacturing. It is therefore desirable to have a secure attachment method and device for the adaptor and housing cups that gives the brake actuator a long useful life, yet allows the adaptor and housing cups to be disassembled without significant damage in order that they may be reused or remanufactured into brake actuators with correspondingly long useful lives.

The problem presented is using aluminum adaptors or housing cups in spring brake assemblies and securely attaching them to their steel counterparts. The present invention provides such a method and apparatus, while at the same time accomplishing many of the desirable conditions described above.

SUMMARY OF THE INVENTION

The present invention provides both a method and apparatus, as well as several alternatives, for securely attaching conventional central adaptors for air brake actuators to service brake housings, emergency brake housings, or both, made from a metal that is dissimilar to that of the adaptor without major modification to either the housing or the adaptor. The open end of the steel part (i.e. adaptor or housing cup) requires an annular shoulder with an elongated annular flange above it, which is a minor change. The open end of the aluminum part (i.e. the corresponding housing cup or adaptor, respectively) requires a small outwardly extending annular lip, which many currently have. The outside diameter of the annular lip must be smaller than the inside diameter of the annular flanges.

A flexible diaphragm is first placed directly on the shoulder of the selected steel part. The aluminum part is then placed on top of the diaphragm such that the annular lip of the aluminum part fits inside the annular flange of the steel part. It is not possible to securely weld such dissimilar metals together; however, it is possible to weld steel to steel. Accordingly, at least one slightly deformable annular steel piece is also provided. The piece may have a single break therein, or multiple breaks resulting in multiple pieces. The piece (or pieces) is placed around the aluminum part so that it comes to rest against the annular aluminum lip while also touching the annular steel flange of the steel part. The one or more breaks in the piece are necessary to allow it to be opened sufficiently to fit around the aluminum part. To the extent that the diameters of the two ends of the adaptor are different, the annular piece for use on the larger diameter end may be continuous (having no break therein) since it will fit over the smaller diameter end. A weld is then applied to connect the annular steel piece(s) to the annular flange, thereby holding the aluminum or steel adaptor and diaphragm securely in place. The weld may be continuous or in parts around the diameter.

Since it is important to obtain a secure seal around the diaphragm, the outside edge of the diaphragm may be slightly thicker than its remaining cross section. Substantial force exceeding 1000 pounds is applied to the adaptor and housing as they are welded together using the annular steel piece. This force compresses and deforms the outside edge of the diaphragm causing an airtight seal. The weld is applied to the steel shoulder flange as remote as possible from the diaphragm in order to avoid damaging or melting it. The shoulder of the steel part may be placed in a heat sink during the welding process to help prevent damage to the diaphragm. However, the heat sink may not be necessary depending upon the material used to make the diaphragm.

The preferred embodiment of the present invention generally will not require any bulky clamps, or any special modifications to the adaptor. It provides a strong and secure attachment between the adaptor and housing, and an airtight seal for the diaphragm. The welded annular steel piece may be later removed without damage to the aluminum or steel parts allowing these parts to be reused with another brake housing.

It is therefore a primary object of the present invention to provide a method and apparatus for securely attaching a central aluminum or steel adaptor piece to either a steel service brake or steel emergency brake housing of an air brake actuator.

It is also a primary object of the present invention to provide a method and apparatus for securely attaching a central steel adaptor piece to either an aluminum service brake or aluminum emergency brake housing of an air brake actuator.

It is also a primary object of the present invention to provide a method and apparatus for assuring a tight seal of the diaphragm between the aluminum or steel adaptor piece and either the service brake or emergency brake housing of an air brake actuator.

It is a further important object of the present invention to provide a method and apparatus for securely attaching an aluminum or steel adaptor piece to a selected steel brake housing by use of an annular steel piece that is fitted over said adaptor and welded to said housing.

It is a further important object of the present invention to provide a method and apparatus for securely attaching a steel adaptor piece to a selected aluminum brake housing by use of an annular steel piece that is fitted over said housing and welded to said adaptor.

It is a further important object of the present invention to provide a method and apparatus for reusing an aluminum or steel adaptor piece that is held in place by the welding onto the steel brake housing of an annular steel piece such that when said welded steel piece is removed said adaptor piece is preserved for reuse.

It is a further important object of the present invention to provide a method and apparatus for reusing an aluminum or steel housing piece that is held in place by the welding onto the steel adaptor of an annular steel piece such that when said welded steel piece is removed said housing piece is preserved for reuse.

It is a further important object of the present invention to provide a method and apparatus for securely attaching an aluminum or steel adaptor piece to a selected steel brake housing by use of an annular steel piece that is fitted over said adaptor and welded to said housing such that when said welded steel piece is removed said adaptor piece and or said housing is preserved for reuse.

It is a further important object of the present invention to provide a method and apparatus for securely attaching an aluminum or steel housing piece to a selected steel adaptor by use of an annular steel piece that is fitted over said housing and welded to said adaptor such that when said welded steel piece is removed said housing piece and/or said adaptor is preserved for reuse.

It is a further important object of the present invention to provide a method and apparatus for securely attaching an aluminum or steel adaptor piece to a selected steel brake housing without cumbersome and space consuming annular clamps having ears, nuts or bolts.

It is a further important object of the present invention to provide a method and apparatus for securely attaching an aluminum or steel adaptor piece to a selected steel brake housing that does not require any major modification of the tooling necessary to create the adaptor or housing.

It is a further object of the present invention to provide a variety of different annular steel pieces each having at least one break therein for use in securely attaching an aluminum or steel adaptor piece to a selected brake housing of an air brake actuator.

It is a further object of the present invention to provide a method and apparatus for securely attaching a central aluminum or steel adaptor piece to either a steel service brake or steel emergency brake housing of an air brake actuator utilizing an annular formed steel piece held in place using rivets, screws or pins.

It is a further object of the present invention to provide a method and apparatus for securely attaching a central steel adaptor piece to either an aluminum service brake or aluminum emergency brake housing of an air brake actuator utilizing an annular formed steel piece held in place using rivets, screws or pins.

It is a further object of the present invention to provide a method and apparatus for securely attaching a central aluminum or steel adaptor piece to either a steel service brake or steel emergency brake housing of an air brake actuator utilizing an annular clamp made of formed steel and a weld.

It is a further object of the present invention to provide a method and apparatus for securely attaching a central steel adaptor piece to either an aluminum service brake or aluminum emergency brake housing of an air brake actuator utilizing an annular clamp made of formed steel and a weld.

It is a further object of the present invention to provide a method and apparatus for securely attaching a central aluminum or steel adaptor piece to either a steel service brake or steel emergency brake housing of an air brake actuator utilizing an annular steel piece and a set of notched tangs which correspond to openings in the housing cap.

It is a further object of the present invention to provide a method and apparatus for securely attaching a central steel adaptor piece to either an aluminum service brake or aluminum emergency brake housing of an air brake actuator utilizing an annular steel piece and a set of notched tangs which correspond to openings in the housing cap.

It is a further object of the present invention to provide a method and apparatus for securely attaching a central aluminum or steel adaptor piece to either a steel service brake or steel emergency brake housing of an air brake actuator utilizing a layer of lamanate carbon fiber.

It is a further object of the present invention to provide a method and apparatus for securely attaching a central steel adaptor piece to either an aluminum service brake or aluminum emergency brake housing of an air brake actuator utilizing a layer of lamanate carbon fiber.

It is a further object of the present invention to provide a method and apparatus for securely attaching a central aluminum or steel adaptor piece to either a steel service brake or steel emergency brake housing of an air brake actuator utilizing an L-shaped annular steel piece co-molded with the cast aluminum adaptor piece and welded to the housing.

It is a further object of the present invention to provide a method and apparatus for securely attaching a central steel adaptor piece to either an aluminum service brake or aluminum emergency brake housing of an air brake actuator utilizing an L-shaped annular steel piece co-molded with the cast aluminum housing piece and welded to the adaptor.

It is a further object of the present invention to provide a method and apparatus for securely attaching a central aluminum or steel adaptor piece to either a steel service brake or steel emergency brake housing of an air brake actuator utilizing a set of discontinuous clips made of formed steel and welds.

It is a further object of the present invention to provide a method and apparatus for securely attaching a central steel adaptor piece to either an aluminum service brake or aluminum emergency brake housing of an air brake actuator utilizing a set of discontinuous clips made of formed steel and welds.

Additional objects of the invention will be apparent from the detailed descriptions and the claims herein.

BRIEF DESCRIPTION OF THE DRAWINGS

FIG. 2A is a side view showing an assembled combination service brake and emergency brake actuator.

FIG. 3 is an enlarged cut away partial side view of a connection between the steel adaptor and the aluminum housing cap of the emergency brake utilizing an annular ring and weld.

FIG. 4 is an enlarged cut away partial side view of an alternative connection between the steel adaptor and the aluminum housing cap of the emergency brake utilizing an annular steel piece and weld.

FIG. 5 is an enlarged cut away partial side view of an alternative connection between the aluminum cast adaptor and the steel housing cap of the emergency brake utilizing an annular formed steel piece held in place using rivets, screws or pins.

FIG. 6 is an enlarged cut away partial side view of an alternative connection between the aluminum cast adaptor and the steel housing cap of the emergency brake utilizing an annular clamp made of formed steel and weld.

FIG. 7 is an enlarged cut away partial side view of an alternative connection between the steel adaptor and the aluminum housing cap of the emergency brake utilizing an annular steel ring and weld.

FIG. 8 is an enlarged cut away partial side view of an alternative connection between the steel adaptor and the aluminum housing cap of the emergency brake utilizing an annular steel piece and weld.

FIG. 9 is an enlarged cut away partial side view of an alternative connection between the steel adaptor and the aluminum housing cap of the emergency brake utilizing an annular steel piece and weld.

FIG. 10 is an enlarged cut away partial side view of an alternative connection between the aluminum cast adaptor and the steel housing cap of the emergency brake utilizing an annular formed steel piece held in place using rivets, screws or pins.

DETAILED DESCRIPTION OF THE DRAWINGS

Figures 1, 2:
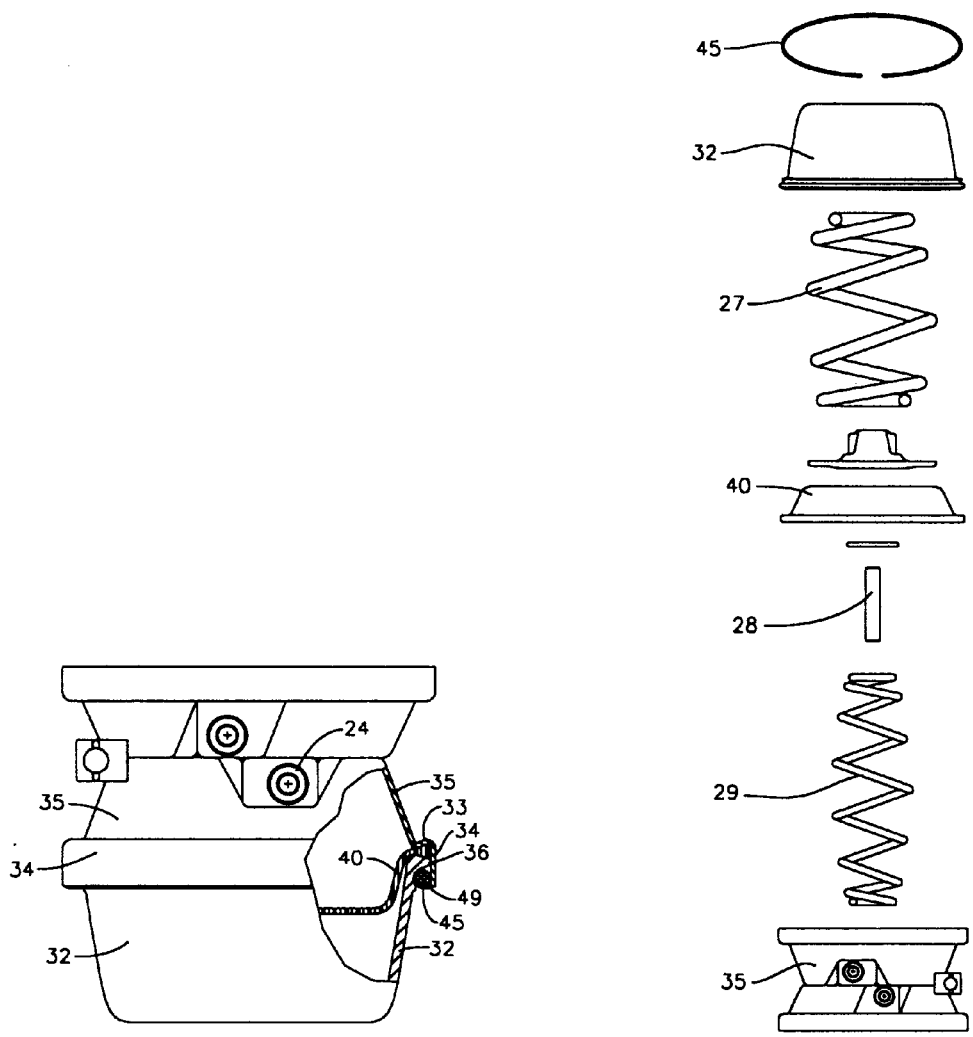
FIG. 1 is a partially cut away side view of the lower portion of a combination service brake and emergency brake actuator showing detail of the attachment of the steel adaptor to the aluminum housing cap of the emergency brake.
FIG. 2 is an exploded perspective view showing the assembly of a combination service brake and emergency brake actuator of the present invention.

Referring to the drawings wherein like reference characters designate like or corresponding parts throughout the several views, and referring particularly to FIGS. 1, 2, 2A and 7 it is seen that the invention includes an air brake actuator, generally 30, including a service brake housing 31, an emergency brake housing 32, and a central cylindrical adaptor base 35 between the service brake and emergency brake housings. A slidable push rod 25 extends outward from the service brake housing for connection to the brakes of the vehicle. Openings 24 are provided in the adaptor for connection to the pneumatic pressure source.

Figure 21A:
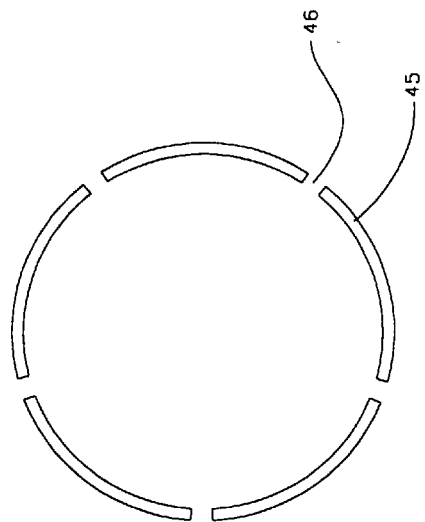
FIG. 21A is a top perspective view of an annular steel member showing multiple openings therein.
Figure 21:
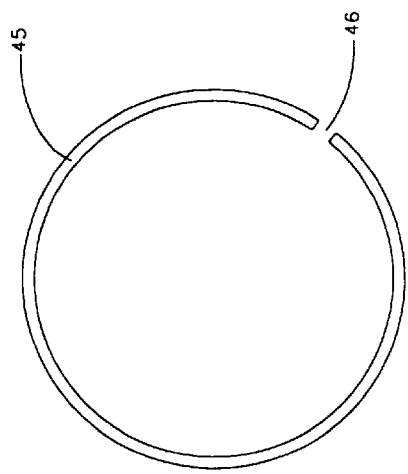
FIG. 21 is a top perspective view of an annular steel member showing a single opening therein.
Figure 21B:
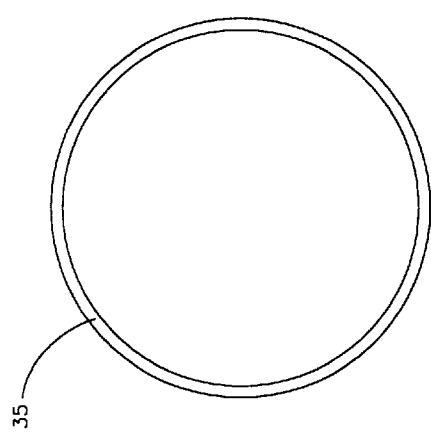
FIG. 21B is a top perspective view of an annular steel member showing no openings therein.

Referring to FIG. 1 and the detail of FIG. 7, it is seen that emergency spring brake adaptor 35 includes an annular shoulder 33 and an annular axially-extending flange 34, and that housing 32 includes an outwardly extending lip 36. A flexible diaphragm 40 is also provided which may have a thickened outer circumferential edge 41. An annular steel retaining piece 45 which may have one or more openings 46 therein (see FIGS. 21, 21A and 21B) is provided between the upper flange 34 of adaptor 35 and housing 32, just above lip 36. Piece 45 is welded to the top of flange 34 at 49. This same configuration may also be used to attach the service brake housing 31 to the opposite end of the adaptor 35.

An exploded view of a combination service brake and emergency brake actuator, including the sub-assembly parts, is shown in FIG. 2. These include the main compression spring 27, an intermediate push rod 28, return springs 29, and push rod 25 with plate, and disc 23.

Figure 13:
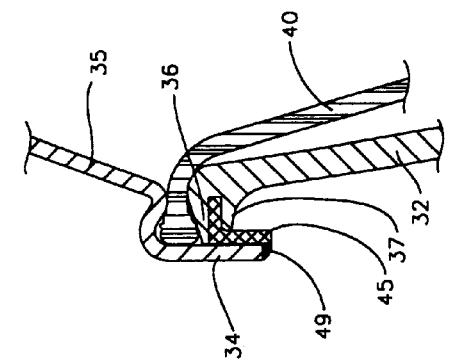
FIG. 13 is an enlarged cut away partial side view of an alternative connection between the steel adaptor and the aluminum housing cap of the emergency brake utilizing an annular steel piece and weld.
Figure 17:
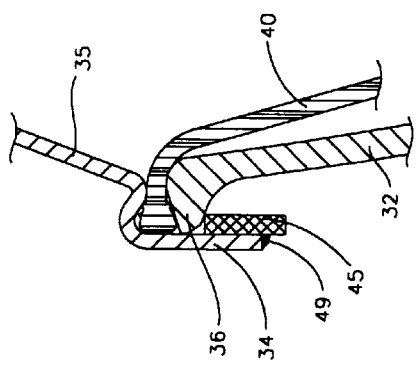
FIG. 17 is an enlarged cut away partial side view of an alternative connection between the steel adaptor and the aluminum housing cap of the emergency brake utilizing an annular steel piece and weld.
Figure 20:
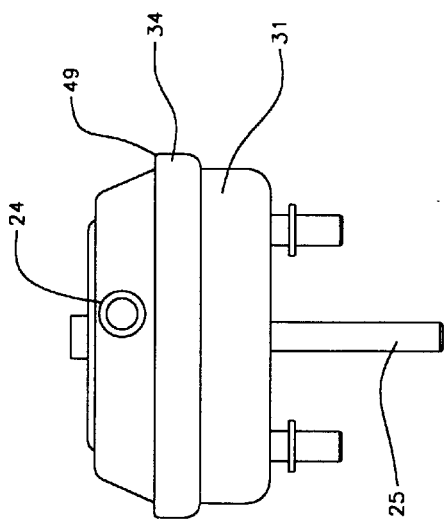
FIG. 20 is a side view of a service brake assembly.

FIGS. 3, 4, 7, 8, 9, 13 and 17 show different embodiments of the broken annular piece 45. In FIG. 3, as in FIG. 7, piece 45 is an annular ring having a round cross section. A second annular lip 37 is provided on aluminum housing 32 in the embodiment of FIG. 3 for securely holding piece 45 in place. FIG. 4 shows a molded annular steel piece 45 having a cross section in the shape of a modified "Z" where one end slides snugly over flange 34, and the other end conforms with lip 36 on housing 32. A resistance spot weld is made where piece 45 fits over the top of axially extending flange 34. FIG. 8 shows piece 45 having a semi-circular cross section so that a flat area is adjacent to flange 34, and weld 49 is made at the top of flange 34. FIG. 9 shows a molded annular piece 45 having a cross section in the shape of a modified "V" with a flat outside adjacent to flange 34, and a rounded inside conforming with the shape of lip 36 on housing 32. FIG. 13 shows annular piece 45 having a rectangular cross section with one flat side adjacent to flange 34. FIG. 17 shows piece 45 as a taller rectangle with more surface area touching flange 34 while the bottom of rectangle 45 holds lip 36 in place.

FIGS. 5 and 10 show a molded annular steel piece 45 which is attached to flange 34 using a rivet, pin or screw 51. In FIG. 10, piece 45 has a cross section in the shape of a modified "Z" where one end slides snugly over flange 34, and the other end conforms with lip 36 on housing 32.

Figure 15:
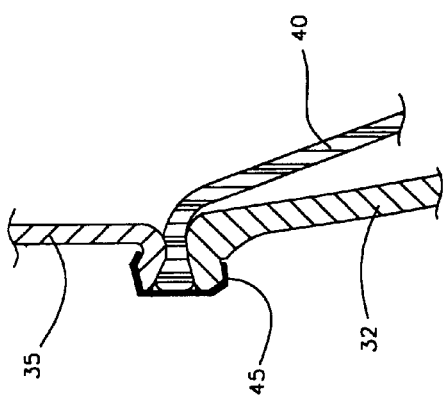
FIG. 15 is an enlarged cut away partial side view of an alternative connection between the aluminum cast adaptor and the steel housing cap of the emergency brake utilizing an annular clamp made of formed steel using an indented adaptor base.
Figure 19:
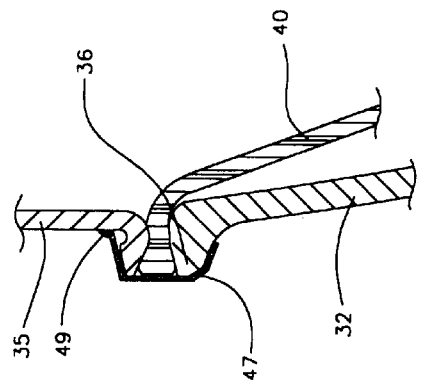
FIG. 19 is an enlarged cut away partial side view of an alternative connection between the aluminum cast adaptor and the steel housing cap of the emergency brake utilizing a set of discontinuous clips made of formed steel and welds.
Figure 19A:
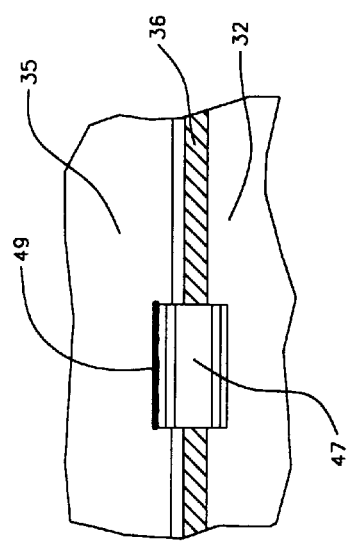
FIG. 19A is an enlarged fragmentary side view of a discontinuous clip welded to the steel housing.

In FIGS. 6, 15 and 19 piece 45 is in the form of an annular C-shaped clamp made of formed steel. It is to be noted that in these three embodiments, housing 32 has no annular flange 34, and diaphragm 40 is sandwiched between housing 32 and adaptor 35 and held in place by clamp piece 45. However, instead of being spin molded or deformed for attachment, as shown in FIG. 6, piece 45 is welded along the bottom edge at 49. A set of discontinuous C-shaped clips 47 may be used instead of a single piece 45 as shown in FIG. 19 and 19A. Alternatively, the bottom of piece 45 may be exaggerated, as shown in FIG. 15, so that no weld is required for attachment.

Figure 11:
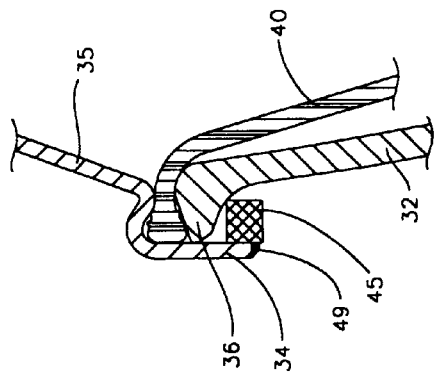
FIG. 11 is an enlarged cut away partial side view of an alternative connection between the aluminum cast adaptor and the steel housing cap of the emergency brake utilizing an annular steel piece and a set of notched tangs which correspond to openings in the housing cap.
Figure 12:
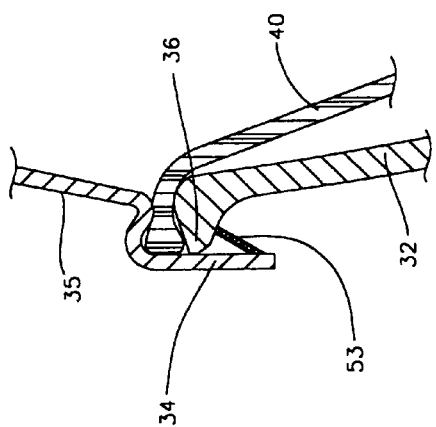
FIG. 12 is an enlarged cut away partial side view of an alternative connection between the aluminum cast adaptor and the steel housing cap of the emergency brake utilizing a set of die punched tangs in the housing cap.

FIGS. 11 & 12 show two related embodiments utilizing a set of tangs instead of a weld. FIG. 11 shows the modified "Z" shaped piece 45 of FIGS. 4 and 10 in which a set of protruding tangs 52 are provided which fit into a set of corresponding notches 38 in flange 34. In FIG. 12, a set of protruding tangs 53 are die punched into flange 34 whereby lip 36 of adaptor 35 is snapped into place.

Figure 14:
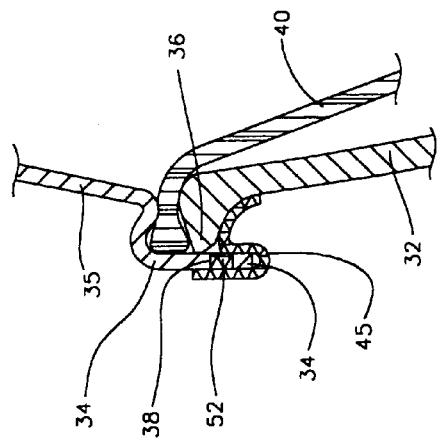
FIG. 14 is an enlarged cut away partial side view of an alternative connection between the aluminum cast adaptor and the steel housing cap of the emergency brake utilizing a layer of lamanate carbon fiber.

In FIG. 14, lamanate carbon fiber 55 is molded into an annular ring around flange 34 and the lower leg and lip 36 of adapter 35.

Figure 16:
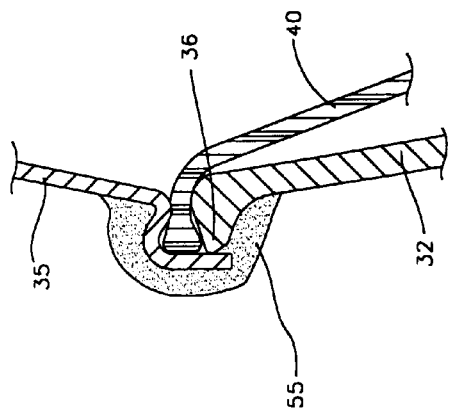
FIG. 16 is an enlarged cut away partial side view of an alternative connection between the steel adaptor and the aluminum housing cap of the emergency brake utilizing an L-shaped annular steel piece co-molded with the die-casted aluminum and welded to the housing.
Figure 18:
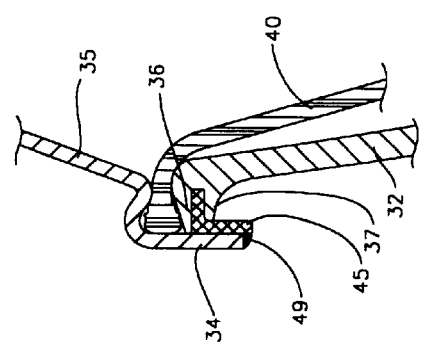
FIG. 18 is an enlarged cut away partial side view of an alternative connection between the steel adaptor and the aluminum housing cap of the emergency brake utilizing an L-shaped annular steel piece welded to the housing.

In FIGS. 16 and 18, the cross section of piece 45 has an L-shape, and lips 36 and 37 of adapter 35 define a pronounced opening into which the horizontal lower end of L-shaped piece 45 fits. The vertical end of piece 45 is adjacent to flange 34 allowing for weld 49 at the top. In the embodiment of FIG. 16, the L-shaped piece is co-molded with the aluminum adaptor.

DESCRIPTION OF THE PREFERRED EMBODIMENTS

In the preferred embodiment, the housing cups of the present invention are made of aluminum and cast in an appropriate mold. However, the present invention works equally well with any metal housing. Tooling for an aluminum housing is far less expensive than forming the same part from a steel sheet. Openings for attachment of each chamber to the pneumatic source are provided in the adaptor. An outside annular lip is provided at each end of the housing. The adaptor between the service brake and emergency brake is made of steel. The open ends of the adaptor each include an annular shoulder adjacent to an axially extending annular flange. The inside diameters of the annular flanges should be slightly larger than the outside diameters of the annular lips on the corresponding ends of the housings so that said lips fit snugly into said flanges. Each annular steel piece 45 should have a diameter that is approximately the same as the corresponding annular lip on either the emergency brake or service brake housing. Each piece 45 may require at least one opening therein to allow it to be easily placed around the main body of each housing, since the lips at the ends of each housing may prevent a solid piece from such engagement. However, there may be more than one break such that piece(s) 45 may be more easily placed around the given annular lip of the housing. At least one solid piece 45 may be used if the diameters of the two ends of the cylindrical adaptor are of sufficiently different sizes.

In the preferred embodiment shown in FIG. 7, an annular lip 35 is provided upon which discontinuous annular piece 45 comes to rest. An annular weld (that is discontinuous only at the break(s) 46 in piece 45) between piece 45 and flange 34 is preferred for maximum attachment security. In the preferred embodiment of FIG. 3, a second annular lip 37 is provided on adaptor 35 in order to form a more secure connection between retaining piece 45 and adaptor 35.

In the alternative embodiments of FIGS. 4, 7, 8, 9, 13 and 17 annular steel piece 45 has different cross sectional shapes, ranging from modified "Z" and other poly-sided shapes (including a modified "V"), which conform closely with the shapes of flange 34 and lip 36, to round, semi-circular and rectangular cross sections each having operable advantages such as low cost of manufacture, ease of assembly, and ease in formation. The annular steel piece 45 of each of these embodiments is welded to flange 34.

In the alternative embodiments of FIGS. 5 & 10 a molded annular steel piece 45 is attached to flange 34 using a rivet, pin or screw 51.

In the alternative embodiments of FIGS. 6, 15 and 19 (and 19A) piece 45 is in the form of an annular C-shaped clamp made of formed steel. The bottom of piece 45 is welded to flange 34 as shown in FIG. 6; and a series of discontinuous clips 47, each welded at the bottom, are shown in FIGS. 19 and 19A. Alternatively, the bottom of piece 45 may be exaggerated, as shown in FIG. 15, so that no weld is required for attachment. In each of these three embodiments, housing 32 has no annular flange 34, and diaphragm 40 is sandwiched between housing 32 and adaptor 35 and held in place by clamp piece 45.

In the alternative embodiments of FIGS. 11 and 12 a set of tangs are used instead of a weld. The embodiment of FIG. 11 uses a set of protruding tangs 52 which fit into a set of corresponding notches 38 in flange 34. In the embodiment of FIG. 12, a set of protruding tangs 53 are die punched into flange 34 whereby lip 36 of adaptor 35 is snapped into place.

In the alternative of FIG. 14, lamanate carbon fiber 55 is molded into an annular ring around flange 34 and the lower leg and lip 36 of adapter 35.

The preferred method of attaching the aluminum housing to the adaptor requires that the adaptor have an annular shoulder 33 and an axially protruding flange 34. The adaptor may be created by stamping from a steel sheet, or another suitable process. The housing is cast from aluminum, although in alternative embodiments it may be made from steel or other ferrous or non-ferrous material. The housing should have an outwardly extending annular lip 36 the outside diameter of which is slightly smaller than the inside diameter of flange 34. The flanged lip can have a configuration that is angled, grooved, drilled, chamfered, machined or as cast. Finally, an annular retaining piece 45 is provided which may be formed, cast, stamped, rolled, punched or machined. It may be made from ferrous or non-ferrous material, and may have at least one break therein to facilitate placing it over the adaptor base. The cross-sectional shape of piece 45 may be round, square, rectangular, semi-circular, strip, or poly-sided. It should have a diameter roughly the same as the annular lip 36 such that it fits snugly inside flange 34 with good metal-to-metal contact. It should also have good metal to metal contact where it overlaps lip 36.

The following common components of the brake actuator system are also assembled into the housing: the main compression spring; a flexible diaphragm 40 having roughly the same diameter as the lip 36; an adaptor base return spring; an intermediate push rod; a push rod plate; O-rings; a pressure plate; a screw and push rod; and grease. It is preferred that the diaphragm may have a slightly thickened outer edge.

The first step in attaching the adaptor to the emergency brake housing 32 is placement of the adaptor in a cold environment such as a heat sink with its open flanged end facing upward. The main spring 27 is compressed into the housing and secured by a retaining tool in a fixture. The adaptor base sub-assembly is made of the return spring 29, intermediate push rod 28, push rod plates, O-rings, screws, push rod 25, and grease (See exploded view of FIG. 2). Diaphragm 40 is then inserted into the adaptor such that its thickened edges are along the shoulder below the annular flange. The sub-assembly is then placed into the adaptor such that the annular lip 36 fits snugly inside annular flange 34, and is resting on top of the thick edges of diaphragm 40. Force in excess of 1000 pounds is then applied to these components using either a pneumatic, mechanical, hydraulic or electrical ram sufficient to create a seal between the sub-assembly and the diaphragm 40. Then, annular retaining piece(s) 45 are placed around housing 32 so that it (they) come into contact with the annular lip 36 of the housing 32 inside flange 34. A second force is then applied to the retainer piece itself which causes good metal-to-metal contact between the piece(s) 45 both the flange 34 and lip 36. This and can be accomplished using mechanical clamps, electromagnetism, or external pressure. While under this second force, piece 45 is fused to the flange of the adaptor. This may be accomplished using a gas tungsten arc welder, or other processes such as gas metal arc welding, arc welding and shield arc welding, oxyfuel gas welding, brazing, soldering, spot, laser beam or the like. A semi-automated welding apparatus may be used which incorporates a thermally cooled block (heat sink) that is shaped to reduce the thermal conduction into the diaphragm. This heat sink helps prevent deformation or destruction of the diaphragm from the heat of the welding process. The weld times, speeds, wire feeds, gas flows, power sources and voltages are parameters set to reduce the thermal load into the diaphragm. The power sources can be either continuous or pulse phase welders. The wire used in the welding process could be either solid or flux cored. After a brief cooling period, the pressure is released, and the attached adaptor and housing assembly may be removed, tested, cleaned and painted.

A similar series of steps are followed to assemble the service brake housing 31 and attach it to the opposite end of the adaptor 35 (see exploded view of FIG. 2).

The fusing of part 45 may be accomplished in at least two different ways. In the preferred method, part 45 is tack fused to the flange while the second force is still holding part 45 in place. This force is then removed, making all of part 45 available for fusing. In the other method, full fusing is performed while the second force is being applied.

Several alternative embodiments of the apparatus are also available. Retaining piece 45 may be made in one of several different configurations having different cross sectional shapes such as circular, semi-circular, rectangular, square or poly-sided. A second annular lip 37 may be provided on housing 32 as shown in FIG. 3 in order to form a more secure connection between retaining piece 45 and housing 32, especially during the fusing process. Retainer piece 45 may be in the form on an "L" which is co-molded with the cast aluminum housing piece as shown in FIG. 16. This embodiment also includes the second annular lip 37 which holds co-molded piece 45 in place.

Another embodiment of both the method and apparatus utilizes pins, screws or rivets to connect the retainer piece 45 to the flange 34, as shown in FIGS. 5 and 10, without the use of any welding. Yet another embodiment of both the method and apparatus employs the use of a set of tangs 53 which are die punched into flange 34 so that lip 36 of adaptor 35 may be snapped into place (see FIG. 12). Still another alternative embodiment employs a set of protruding tangs 52 which fit into a set of corresponding notches 38 in flange 34 (see FIG. 10). Another embodiment utilizes a C-clamp that is either clipped or welded into place to hold the housing to the adaptor (see FIGS. 6 and 15); this clamp may also be in the form of discontinuous clips which are each welded to the housing (see FIGS. 19 and 19A). Lamanate carbon fiber 55 may be molded into an annular ring around flange 34 and the lower leg and lip 36 of adapter 35 as shown in FIG. 14.

The present invention is equally useful for either aluminum or steel adaptor parts 35. The present invention may also be used on such products as piston brakes which use a solid piston rather than a flexible diaphragm.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. A brake actuator comprising:
   a. an cylindrical adaptor having an annular shoulder and an axially protruding annular flange;
   b. a flexible diaphragm stretched across said adaptor on said shoulder;
   c. a brake housing cup having an annular lip at its edge provided over said diaphragm at said shoulder adjacent to said annular flange;
   d. an annular retaining piece provided over said lip and on the inside of said flange; and
   e. at least one weld connecting said retaining piece to said annular flange, for holding the lip of said housing securely against said adaptor.

2. The actuator described in claim 1 wherein a second annular lip is provided on said housing in close proximity to the first annular lip such that said annular retaining piece fits between said lips.

3. The actuator described in claim 1 wherein said retaining piece is discontinuous.

4. The actuator described in claim 1 wherein said retaining piece has a circular cross section.

5. The actuator described in claim 1 wherein said retaining piece has a semi-circular cross section.

6. The actuator described in claim 1 wherein said retaining piece has a rectangular cross section.

7. The actuator described in claim 1 wherein said retaining piece has a square cross section.

8. The actuator described in claim 1 wherein said retaining piece has an L-shaped cross section.

9. The actuator described in claim 1 wherein said retaining piece has a cross section in the shape of a modified "V".

10. The actuator described in claim 1 wherein said retaining piece has a cross section in the shape of a modified "Z".

11. The actuator described in claim 1 wherein said retaining piece has a poly-sided cross section.

12. An apparatus for connecting a brake actuator adaptor and housing together comprising:
   a. a cylindrical adaptor having an annular shoulder adjacent to an axially protruding annular flange;
   b. a rounded flexible diaphragm peripherally supported by said shoulder, said diaphragm having approximately the same diameter as the inside of said annular flange;
   c. a brake housing cup having an outwardly extending annular lip the outside diameter of which is slightly smaller than the inside diameter of said annular flange peripherally supported by said diaphragm and shoulder;
   d. an annular steel retaining piece on said lip and inside said flange, said piece having a diameter approximately the same as said annular lip; and
   e. at least one weld connecting said annular piece to said annular flange, for holding said adaptor securely against said housing.

13. A method for assembling a spring brake actuator comprising the steps of:
   a. forming a cylindrical adaptor with an annular shoulder and an axially protruding annular flange;
   b. forming a spring brake actuator housing cup with an outwardly extending annular lip at least one end;
   c. forming an annular retaining piece having a diameter approximately the same as said annular lip;
   d. placing the adaptor in a cooled environment;
   e. inserting a flexible diaphragm into the adaptor such that its edges fit along said shoulder adjacent to said annular flange;
   f. inserting the housing cup into the adaptor such that the annular lip fits inside and against the annular flange, resting on top of the edges of the diaphragm;
   g. applying force to the adaptor and housing sufficient to create a seal between the housing cup and the diaphragm;
   h. placing the annular retaining piece around the housing cup lip such that it comes into contact with both the lip and the inside of the flange;
   i. applying a second force to said retaining piece; and
   j. fusing the retaining piece to the flange of the adaptor.

14. The method described in claim 13 wherein said annular retaining piece is discontinuous.

15. A method for connecting a spring brake actuator housing to an adaptor comprising the steps of:
   a. forming a cylindrical adaptor with an annular shoulder and an axially protruding annular flange;
   b. forming a spring brake actuator housing cup with an outwardly extending annular lip at one end, the outside diameter of which is slightly smaller than the inside diameter of said flange;
   c. forming an annular retaining piece having a diameter approximately the same as said annular lip such that it fits snugly inside said flange with good metal-to-metal contact with both said flange and said lip;
   d. placing the adaptor in a heat sink environment;
   e. compressing a main spring into the housing cup;
   f. creating a sub-assembly comprised of at least the following components: an adaptor base return spring, an intermediate push rod, a push rod plate, a pressure plate, and a push rod;
   g. inserting a flexible diaphragm into the adaptor such that its edges fit along said shoulder adjacent to said annular flange;
   h. inserting the housing cup and sub-assembly into the adaptor such that the annular lip fits snugly inside the annular flange, resting on top of the edges of the diaphragm;
   i. applying force to the adaptor and housing sufficient to create a seal between the sub-assembly and the diaphragm;
   j. placing the annular retaining piece around the housing cup lip such that it comes into contact with both the lip and the inside of the flange;
   k. applying a second force to said retaining piece; and
   l. fusing the retaining piece to the flange of the adaptor.

* * * * *